United States Patent
Bartlett et al.

(10) Patent No.: US 6,488,083 B2
(45) Date of Patent: Dec. 3, 2002

(54) TUBING HANGER SYSTEM

(75) Inventors: Christopher D. Bartlett, Spring, TX (US); Christopher E. Cunningham, Spring, TX (US); Richard D. Kent, Newburgh (GB); Nicholas Gatherar, Juniper Green (GB)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/815,351

(22) Filed: Mar. 22, 2001

(65) Prior Publication Data

US 2001/0054507 A1 Dec. 27, 2001

Related U.S. Application Data (60) Provisional application No. 60/192,124, filed on Mar. 24, 2000, and provisional application No. 60/200,239, filed on Apr. 28, 2000.

(51) Int. Cl.[7] .............................................. E21B 19/00
(52) U.S. Cl. ..................... 166/87.1; 166/95.1; 166/321; 166/86.3
(58) Field of Search ............................... 166/208, 368, 166/348, 95.1, 97.1, 87.1, 88.1, 321, 185, 186, 75.14, 86.3

(56) References Cited

U.S. PATENT DOCUMENTS

| | | | |
|---|---|---|---|
| 3,330,341 A | * | 7/1967 | Jackson, Jr. et al. ........ 166/136 |
| 3,448,803 A | * | 6/1969 | Sizer .......................... 166/115 |
| 3,494,420 A | * | 2/1970 | Sizer ........................ 166/250.01 |
| 4,126,183 A | | 11/1978 | Walker |
| 4,258,786 A | * | 3/1981 | Lochte et al. .......... 137/625.18 |
| 4,405,014 A | * | 9/1983 | Talafuse ........................ 166/72 |
| 4,651,831 A | * | 3/1987 | Baugh ......................... 166/313 |
| 4,807,700 A | | 2/1989 | Wilkins |
| 4,848,457 A | | 7/1989 | Lilley |
| 4,903,774 A | * | 2/1990 | Dykes et al. ............... 166/321 |
| 4,958,686 A | | 9/1990 | Putch |
| 5,040,604 A | | 8/1991 | Friedman et al. |
| 5,044,432 A | | 9/1991 | Cunningham et al. |
| 5,143,158 A | | 9/1992 | Watkins et al. |
| 5,503,230 A | | 4/1996 | Osborne et al. |
| 5,544,707 A | | 8/1996 | Hopper et al. |
| 5,687,794 A | | 11/1997 | Watkins et al. |
| 5,706,893 A | | 1/1998 | Morgan |
| 5,988,282 A | | 11/1999 | Jennings et al. |
| 6,257,549 B1 | * | 7/2001 | Hooper ........................ 166/363 |
| 6,345,668 B1 | * | 2/2002 | Reilly ......................... 166/208 |

FOREIGN PATENT DOCUMENTS

| | | | |
|---|---|---|---|
| EP | 0331227 A1 | * | 9/1989 |
| EP | 0624711 A1 | * | 11/1994 |
| EP | 0 624 711 A1 | | 11/1994 |
| EP | 0 854 267 A2 | | 7/1998 |
| GB | 2 049 765 A | | 12/1980 |
| GB | 2 214 543 A | | 9/1989 |
| GB | 2 218 135 A | | 11/1989 |
| GB | 2 291 085 A | | 1/1996 |
| GB | 2 319 544 A | | 5/1998 |
| WO | WO00/47864 A1 | | 8/2000 |
| WO | WO01/55550 A1 | | 8/2001 |

* cited by examiner

Primary Examiner—Thomas B. Will
Assistant Examiner—Thomas A. Beach
(74) Attorney, Agent, or Firm—Henry C. Query, Jr.

(57) ABSTRACT

A tubing hanger for a flow completion system which comprises a Christmas tree connected above a wellhead housing that includes a central bore in which the tubing hanger is supported, the tubing hanger comprising a generally annular body; a production bore which extends generally axially through the body; an annulus bore which extends generally axially through the body; the annulus bore comprising a generally lateral first branch which is connected to a generally axial second branch; and a closure member which includes a gate that is moveable generally axially across the first branch between an open position in which a hole in the gate is aligned with the first branch and a closed position in which the hole is offset from the first branch.

14 Claims, 6 Drawing Sheets

TUBING HANGER SYSTEM

This application is based on U.S. Provisional Patent Application No. 60/192,124, which was filed on Mar. 24, 2000, and U.S. Provisional Patent Application No. 60/200,239, which was filed on Apr. 28, 2000.

BACKGROUND OF THE INVENTION

The present invention relates to a tubing hanger for a flow completion system that is used to produce oil or gas from a well. More particularly, the invention relates to a tubing hanger which comprises an annulus bore extending generally vertically therethrough and a remotely-operable closure member for controlling fluid flow through the annulus bore.

In a conventional flow completion system, a tubing hanger is landed in a wellhead housing which is installed at the upper end of a well bore, and a Christmas tree is connected to the top of the wellhead housing over the tubing hanger. The tubing hanger supports at least one tubing string which extends into the well bore and defines both a production bore within the tubing string and a production annulus surrounding the tubing string. In addition, the tubing hanger comprises at least one vertical production bore for communicating fluid between the tubing string and a corresponding production bore in the Christmas tree, and typically at least one vertical annulus bore for communicating fluid between the tubing annulus and a corresponding annulus bore in the christmas tree. Furthermore, the tubing hanger may comprise one or more vertical service and control conduits for communicating control fluids and well chemicals through the tubing hanger to devices or positions located in or below the tubing hanger.

During installation and workover of the conventional flow completion system, the tubing hanger annulus bore must typically remain closed until either the christmas tree or a blowout preventer ("BOP") is connected to the wellhead housing. However, after the christmas tree or BOP is installed on the wellhead housing, the tubing hanger annulus bore must usually be opened to allow for venting of the tubing annulus during production or circulation through the tubing annulus during workover. In prior art tubing hangers for conventional flow completion systems, a wireline plug is typically used to close the tubing hanger annulus bore. However, each installation or removal of the plug requires a special trip from a surface vessel. Moreover, although several versions of hydraulically actuated valves for controlling flow through the tubing hanger annulus bore have been patented, these valves have for the most part been impractical to implement.

SUMMARY OF THE INVENTION

In accordance with the present invention, these and other disadvantages in the prior art are overcome by providing a tubing hanger for a flow completion system which comprises a christmas tree that is connected above a wellhead housing that includes a central bore in which the tubing hanger is supported. The tubing hanger comprises a generally annular body, a first annular seal which is positioned between the body and the central bore, a production bore which extends generally axially through the body, and an annulus bore which extends generally axially through the body from below the tubing hanger to a portion of the central bore that is located above the first seal. In addition, the annulus bore comprises a generally lateral first branch which is connected to a generally axial second branch, and the tubing hanger includes a remotely-actuated closure member which comprises a gate that is moveable generally axially across the first branch between an open position in which a hole in the gate is aligned with the first branch and a closed position in which the hole is offset from the first branch.

In accordance with a further aspect of the present invention, the tubing hanger also comprises a second annular seal which is positioned between the body and the central bore above the first seal, and a gate cavity in which the gate is at least partially positioned and which extends into the body from between the first and second seals. Furthermore, the tubing hanger includes an actuating mechanism for the gate which is positioned in a conduit that preferably extends generally axially through the body above the gate cavity.

Thus, the tubing hanger of the present invention permits flow through the annulus bore to be reliably controlled from a remote location without the use of wireline plugs. In addition, the pressure within the gate cavity is contained by the first and second seals without the need for separate sealing means for this purpose. Furthermore, since the gate and its actuating mechanism are oriented generally axially within the tubing hanger, the closure member occupies a minimum radial cross-sectional area of the tubing hanger.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
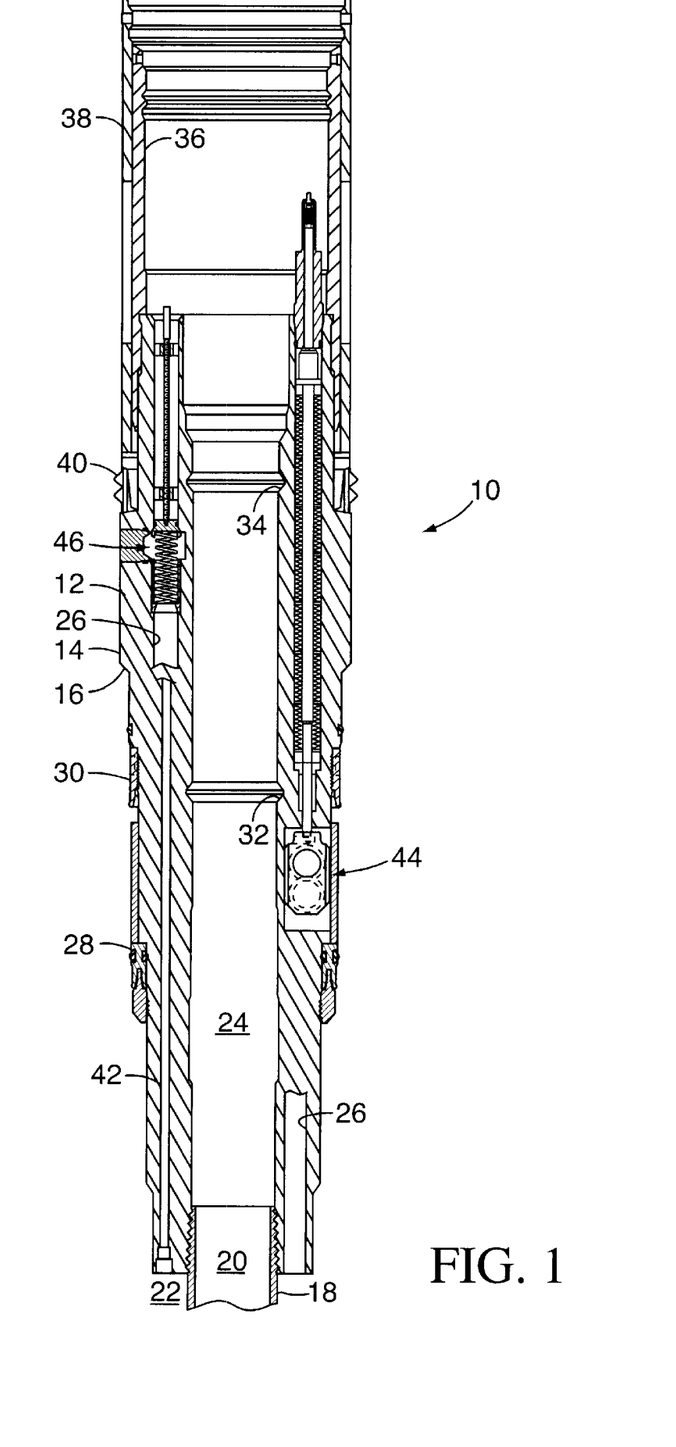
FIG. 1 is a longitudinal cross-sectional view of the tubing hanger of the present invention.

Referring to FIG. 1, the tubing hanger of the present invention, which is indicated generally by reference number 10, is designed to be installed in a wellhead housing of a conventional flow completion system. Accordingly, while the tubing hanger 10 is similar in many respects to the tubing hanger disclosed in applicants' co-pending U.S. patent application Ser. No. 09/815,437, which is hereby incorporated herein by reference, tubing hanger 10 includes certain changes that make it more suitable for use with a conventional flow completion system. These changes will be made apparent from the following description.

The tubing hanger 10 comprises a generally annular body 12 having an outer, preferably stepped cylindrical wall 14 which forms a landing seat 16 that is adapted to rest on a corresponding landing shoulder formed in the wellhead housing (not shown). The tubing hanger 10 supports at least one tubing string 18 which extends into the well bore and defines a production bore 20 within the tubing string and a tubing annulus 22 surrounding the tubing string. In addition, the tubing hanger 10 comprises a concentric production bore 24 which extends axially through the body 12 and communicates with the tubing string production bore 20, and an annulus bore 26 which extends through the body 12 from the tubing annulus 22 to the top of the tubing hanger.

The tubing hanger 10 also includes first and second preferably metal seal rings 28, 30 which are mounted on the outer wall 14 and are adapted to seal against corresponding sealing surfaces that are formed in the bore of the wellhead housing. Furthermore, a first profile 32 for a first wireline crown plug (not shown) is preferably formed in the production bore 24, and ideally a second profile 34 for a second wireline crown plug (not shown) is also formed in the production bore 24 above the first profile 32. Thus, in the event the Christmas tree needs to be removed from the wellhead housing, at least one and preferably two crown plugs may be installed in the production bore 24 to effectively seal the well bore from the environment.

Furthermore, although not necessarily part of the present invention, the tubing hanger 10 also comprises a cylindrical rim 36 which is connected to the top of the tubing hanger, a locking mandrel 38 which is slidably received over the rim 36 and is actuated by the locking piston of a tubing hanger running tool during installation of the tubing hanger, and a lock ring 40 which is actuated by the locking mandrel to secure the tubing hanger to the wellhead housing.

The tubing hanger 10 may also comprise a number of service and control conduits 42. In the embodiment of the invention shown in FIG. 1, the service and control conduits 42 are arranged radially about the central axis of the tubing hanger and extend into the body 12 from the top of the tubing hanger 10. Each service and control conduit 42 extends into or completely through the tubing hanger 10 and functions to communicate control signals or fluids from corresponding external service and control lines (not shown) to devices or positions which are located in or below the tubing hanger. For example, the service and control conduits 42 may serve to communicate hydraulic control fluid to valves or other known devices which are located in or below the tubing hanger 10. The external service and control lines are connected to the service and control conduits through conventional fluid couplings or stabs which are mounted on the tubing hanger running tool or the christmas tree. Furthermore, the tubing hanger 10 preferably includes a closure member for controlling flow through each service and control conduit which extends completely through the tubing hanger to other than a down hole valve. For example, in applicants' co-pending U.S. patent application No. 09/815,395, which is hereby incorporated herein by reference, a multiport gate valve assembly is used to control the flow through several service and control conduits simultaneously. Alternatively, the tubing hanger 10 may comprise an individual closure member, such as a hydraulically actuated plug valve, to control the flow through each service and control conduit 42 individually. Thus, in the event the christmas tree needs to be removed from the wellhead housing, the service and control conduits 42 can be sealed off so that the tubing hanger 10 can function as an effective barrier to the well bore.

Figure 2:
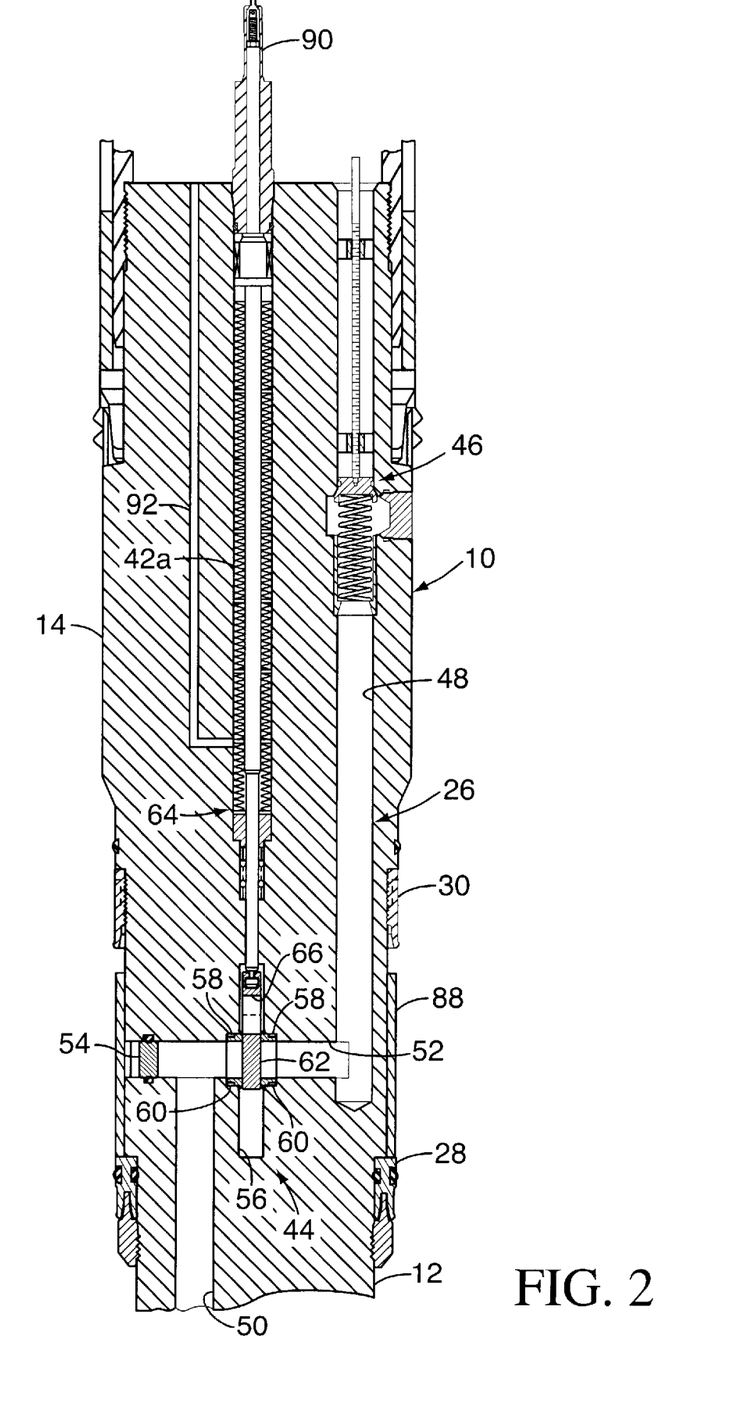
FIG. 2 is a longitudinal cross-sectional view of the tubing hanger of FIG. 1 taken through the tubing hanger annulus bore and annulus gate valve assembly depicted in FIG. 1.
Figure 3:
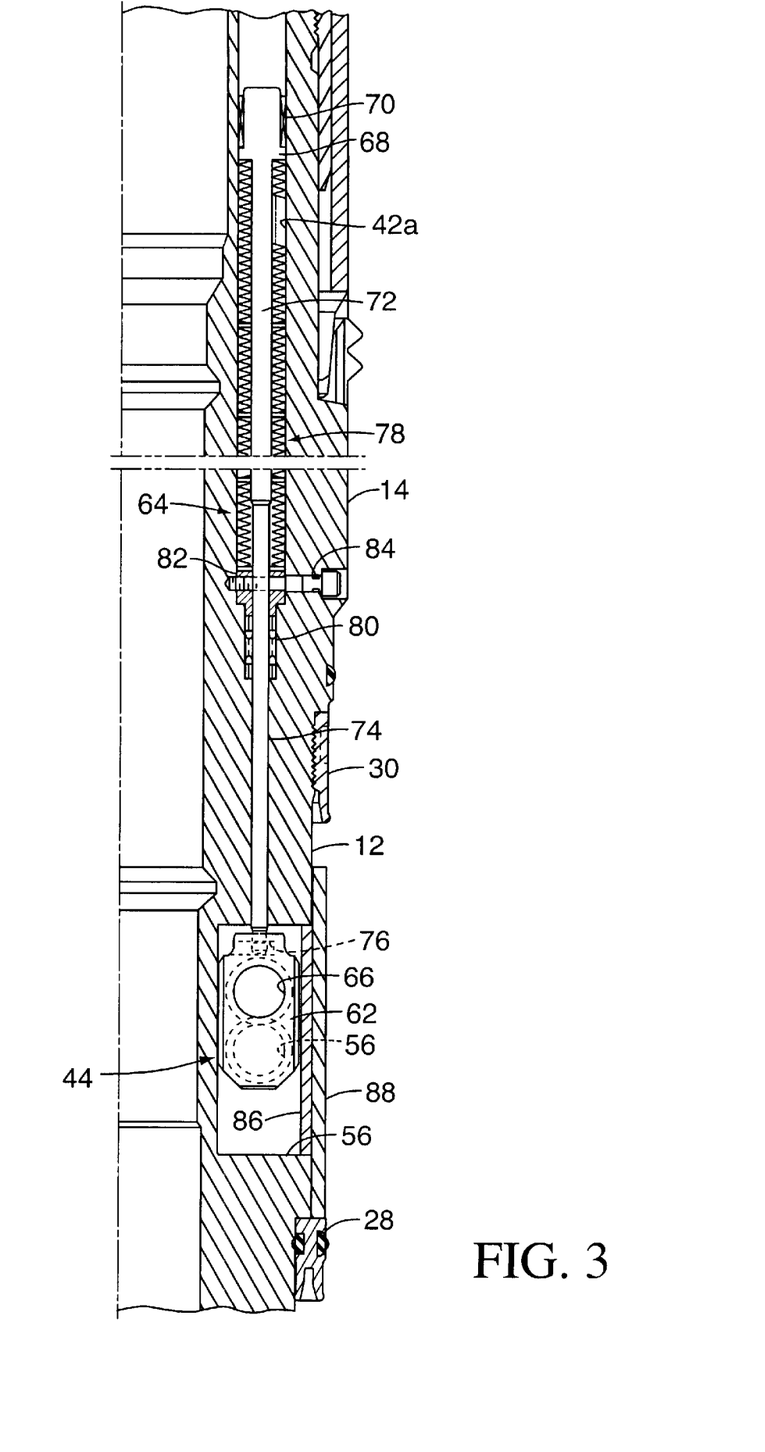
FIG. 3 is an enlarged longitudinal cross-sectional view of the annulus gate valve assembly depicted in FIG. 2.

According to the present invention, the tubing hanger 10 includes a first closure member 44 and, in the embodiment of the invention depicted in FIG. 1, preferably also a second closure member 46 for controlling the flow through the annulus bore 26. The first closure member 44 is preferably an internal gate valve which is similar to that disclosed in applicants' copending U.S. patent application No. 09/815,436, which is hereby incorporated herein by reference. Referring to FIGS. 2 and 3, the gate valve 44 is unique in that substantially all of its operational components are housed entirely within the body 12 of the tubing hanger 10. In addition, the gate valve 44 is oriented generally axially so as to occupy a minimum of the radial cross sectional area of the tubing hanger 10. In order to most readily accommodate this vertical orientation of the gate valve 44, the annulus bore preferably includes a lateral branch which is connected to a longitudinal branch, and the gate valve is disposed across the lateral branch. For example, In FIGS. 2 and 3 the annulus bore 26 is shown to comprise an upper branch 48 which extends generally axially through the body 12 to the top of the tubing hanger 10, a lower branch 50 which extends generally axially through the body 12 to the bottom of the tubing hanger, and an intermediate branch 52 which extends generally laterally between the upper and lower branches. To facilitate the formation of the annulus bore 26, the intermediate branch 62 is ideally machined into the outer wall 14 and then sealed by a plug member 54 or any other suitable means.

The gate valve 44 comprises a generally rectangular gate cavity 56 which extends generally laterally through the outer wall 14 and intersects both the intermediate branch 52 and a service and control conduit 42a. In addition, an annular seat pocket 58 extending transversely into the body 12 is preferably formed at each intersection of the gate cavity 56 with the intermediate branch 52. The gate valve 44 also comprises two ring-shaped floating-type seats 60, each of which is positioned in a seat pocket 58, a gate 62 which is slidably disposed between the seats 60, and an actuating mechanism 64 which is positioned substantially in the service and control conduit 42a.

The actuating mechanism 64 functions to move the gate 62 between a valve open position wherein a lateral hole 66 in the gate is aligned with the intermediate branch 52, and a valve closed position wherein the hole 66 is offset from the intermediate branch 52, as shown in FIG. 2. In a preferred embodiment of the invention, the actuating mechanism 64 comprises an upper piston head 68 which supports a seal 70 that engages the service and control conduit 42a, an elongated piston rod 72 which is connected to the bottom of the piston head 68, a valve stem 74 which is connected between the lower end of the piston rod 72 and the top of the gate 62, for example via a T-slot connection 76, and a return biasing means 78 which is operatively engaged between the body 12 and the piston head 68. In one embodiment of the invention, the return biasing means 78 comprises a mechanical biasing means, such as a helical compression spring or the stack of Belleville washers which is shown in FIG. 3. In addition, the valve stem 74 is preferably sealed against the service and control conduit 42a by a suitable packing 80, which is held in place by a gland nut 82 that in turn is secured to the body 12 by suitable means, such as a retainer screw 84.

The opening that the gate cavity 56 forms in the wall 14 is optimally closed by a simple cover plate 86 which is held in place by a cylindrical sleeve 88 that is telescopically received over the tubing hanger 10. The pressure in the gate cavity 56 is therefore preferably contained within the first and second seal rings 28, 30, in addition to the packing 80. Consequently, no need exists for separate sealing means between the body 12 and either the cover plate 86 or the sleeve 88 to contain the pressure within the gate cavity 56. However, the present invention contemplates that one or more such seals could be provided between the body 12 and either the cover plate 86 or the sleeve 88, to contain the pressure within the gate cavity 56, especially when the opening that the gate cavity forms in the wall 14 is not located between the seal rings 28, 30. In addition, instead of the cover plate 86 being retained by the sleeve 88, the sleeve could be dispensed with and the cover plate simply bolted onto the body, in which event seals are preferably provided between the cover plate and the body to retain the pressure within the gate cavity 56.

In operation, the gate valve 44 is normally in the closed position. When it is desired to open the annulus bore 26, a pressure sufficient to overcome the combined force of the return biasing means 78 and the friction at the various interfaces of the gate valve is introduced into the service and control conduit 42a above the piston head 68. As shown in FIG. 2, a male coupling 90 may be installed in the top of the service and control conduit 42a to facilitate connecting a pressure source, such as a high pressure hydraulic fluid source, to the service and control conduit. The male coupling 90 is engaged by a corresponding female coupling (not shown) which is mounted in either the tubing hanger running tool or the Christmas tree and which in turn is connected to the pressure source by a corresponding external service and control line in a conventional fashion. Alternatively, the top of the service and control conduit 42a may merely include a seal profile for a stab which is carried on the tubing hanger running tool or the Christmas tree and is connected to the pressure source by conventional means. The pressure in the service and control conduit 42a will force the piston head 68 downward and thus move the gate 62 into the open position. In this position, fluid in the tubing annulus 22 is allowed to flow from the lower branch 50, through the intermediate branch 52 and into the upper branch 48, where it will encounter the closure member 46 if present. As shown in FIG. 2, the tubing hanger 10 preferably includes a compensation port 92 which extends between the top of the tubing hanger and the portion of the service and control conduit 42a below the piston head 68. While not shown in the drawings, a male coupling or stab profile may be provided at the top of the compensation port 92 to facilitate the connection of this port through the tubing hanger running tool or the Christmas tree with a corresponding external service and control line.

When it is desired to close the gate valve 44, the pressure is removed from the service and control conduit 42a, whereupon the force from the return biasing means 78 combined with the pressure in the annulus bore 26 acting on the stem 72 will push the piston head 68 upward and move the gate 62 into the closed position. If the means supplying the pressure to the service and control conduit 42a should fail for any reason, the return biasing means 78 will either retain the gate 62 in the closed position or move the gate from the open position to the closed position. Thus, in the preferred embodiment of the invention the gate valve 44 is a "fail closed" device.

In an alternative embodiment of the gate valve 44 which is not specifically illustrated in the drawings, the actuating mechanism 64 is a pressure balanced operating mechanism. Consequently, the return biasing means 78 would not be required. Instead, the compensation port 92 is connected to a pressure source in the same manner that the service and control conduit 42a is connected to a pressure source. In order to return the gate valve to the closed position, therefore, pressure is introduced into the compensation port 92 to force the piston head 68, and thus the gate 62, upward. In this embodiment, the gate valve 44 would be a "fail as is" device.

Figure 4:
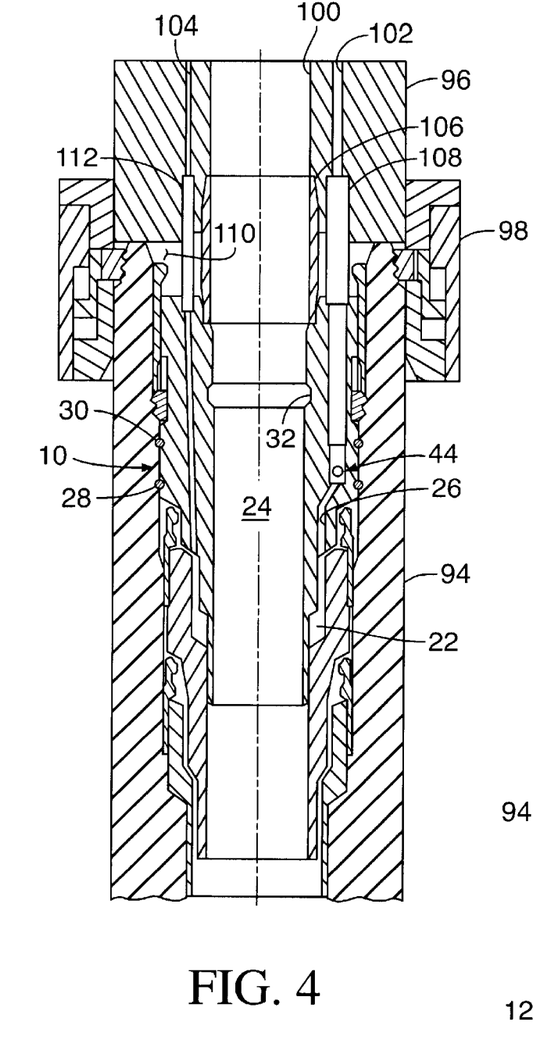
FIG. 4 is a representation of the tubing hanger of the present invention installed in a conventional flow completion system.

Referring now to FIG. 4, a representation of the tubing hanger 10 is shown landed in a wellhead housing 94 which is installed at the upper end of a well bore (not shown). Alternatively, the tubing hanger 10 could be landed in a tubing head (not shown) which has previously been connected to the top of the wellhead housing 94. A conventional Christmas tree 96 (only a portion of which is shown in FIG. 4) is secured to the top of the wellhead housing 94 by a suitable connector 98. The christmas tree 96 can be of any known type, but it preferably includes a vertical production bore 100, an annulus bore 102 and at least one service and control conduit 104. The tubing hanger production bore 24 is preferably connected to the christmas tree production bore 100 by a production stab 106. Similarly, the tubing hanger annulus bore 26 is optimally connected to the christmas tree annulus bore 102 by an annulus seal stab 108. Alternatively, the tubing hanger annulus bore and the Christmas tree annulus bore may communicate via the gallery 110 between the tubing hanger and the Christmas tree without the use of an annulus seal stab. Finally, each tubing hanger service and control conduit 104 is connected with its corresponding Christmas tree service and control conduit by a control/signal stab 112. The construction of such stabs and their manner of installation in the tubing hanger and Christmas tree are well understood in the art. The Christmas tree 96 also includes the typical means (not shown) for controlling flow through the production and annulus bores 100, 102 and for interfacing the service and control conduits 104 with corresponding external service and control lines (not shown).

The tubing hanger 10 is particularly useful in a conventional flow completion system, such as that shown in FIG. 4. However, in order to maximize the benefit of the tubing hanger 10, the wellhead housing 94 is preferably specially constructed in accordance with another aspect of the present invention.

Figure 5:
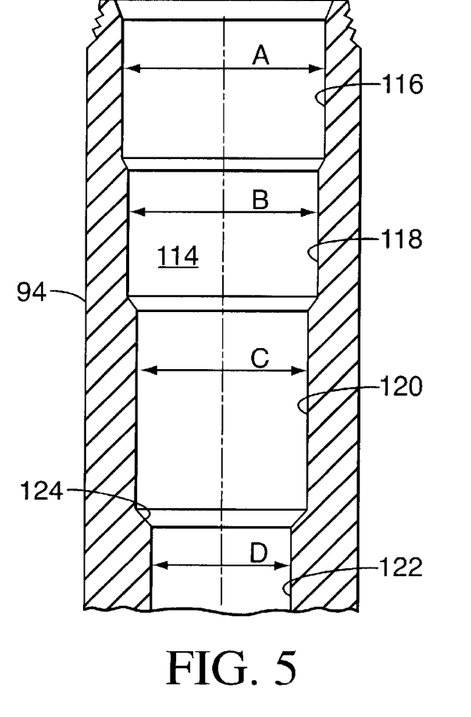
FIG. 5 is a representation of a wellhead housing which is specially constructed for use with the tubing hanger of the present invention.

Referring to FIG. 5, the wellhead housing 94 comprises a central bore 114 which is formed with preferably four nominal portions or bores 116, 118, 120 and 122 having respective diameters A, B, C and D. In addition, a first support shoulder 124 is formed between the bores 120 and 122. Bore 116 is nominally the same size as the bore of the BOP (not shown) which is connected to the wellhead housing 94 during installation and workover of the tubing hanger 10. Bore 118 comprises either one large or two individual annular sealing surfaces for the first and second seal rings 28, 30 which are mounted on the tubing hanger 10. Bore 120 comprises either one large or two individual annular sealing surfaces for preferably two casing hanger packoffs, as will be discussed below. Finally, the diameter of the bore 122 is the drift diameter of the wellhead housing 94.

Figure 6:
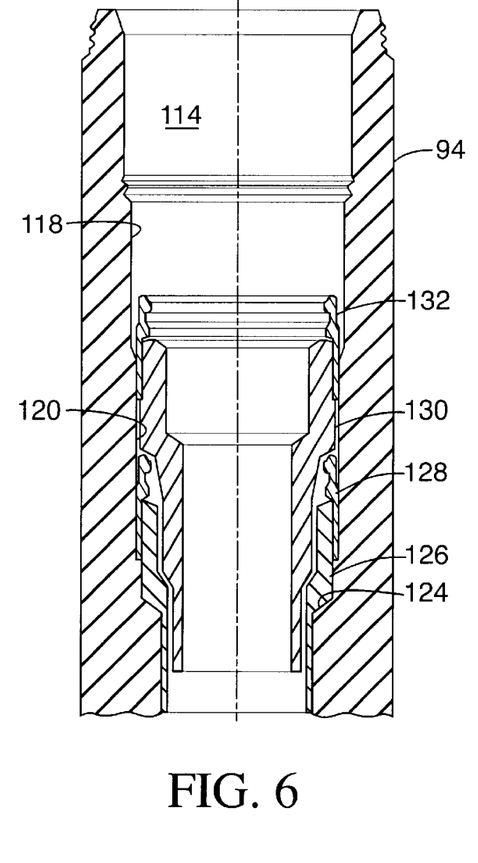
FIG. 6 is a representation of the wellhead housing of FIG. 5 with two casing hangers landed therein.
Figure 7:
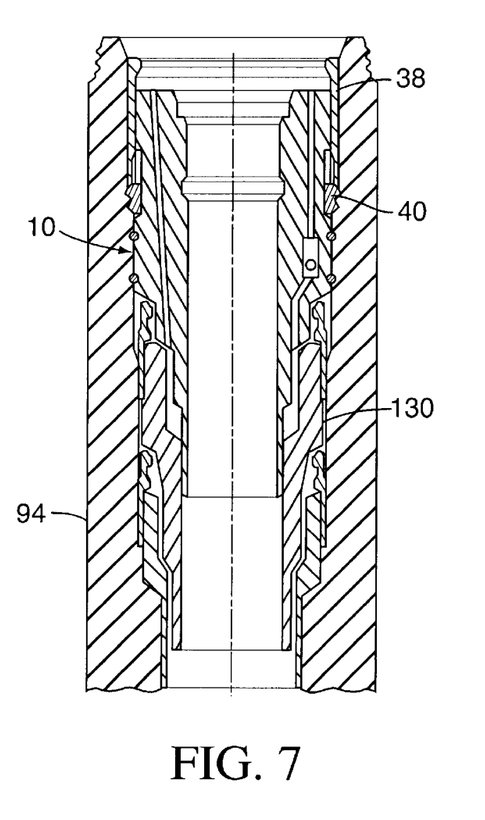
FIG. 7 is representation of the wellhead housing of FIG. 6 with the tubing hanger of FIG. 4 landed therein.

The installation of the tubing hanger will now be described with reference to FIGS. 6 and 7. First, the wellhead housing 94 is landed and connected to a conductor housing (not shown) in a manner well understood by those skilled in the art. After drilling the well bore to a first prescribed depth, a first casing hanger 126 having a first string of casing suspended therefrom is landed on the shoulder 124 in the well head housing 94. The first casing string is then cemented in the well bore and a packoff 128 is installed between the casing hanger 126 and the bore 120. The well is then drilled to a second prescribed depth and, if required, a second casing hanger 130 having a second string of casing suspended therefrom is landed on a shoulder formed in the bore of the first casing hanger 126. After the second casing string is cemented in the well bore, a packoff 132 is installed between the second casing hanger 130 and the bore 120. If required, additional casing hangers having casing strings suspended therefrom may be landed in the wellhead housing 94 and cemented in the well bore. Finally, the tubing hanger 120 with the tubing string suspended therefrom is lowered and landed on either the second casing hanger 130 or a second landing shoulder formed in the bore 114 of the wellhead housing 94, and the locking mandrel 38 is actuated to force the lock ring 40 into a corresponding groove in the bore 114 to thereby lock the tubing hanger to the wellhead housing 94, as shown in FIG. 7.

Thus, it may be seen that the wellhead housing 94 comprises a separate bore, namely bore 118, against which the seal rings 28, 30 may seal. Bore 118 is distinct from both the drift diameter bore 122 and the bore 120 against which the casing hanger packoffs 128, 132 must seal. Consequently, the sealing surfaces which are formed in the bore 118 are less likely to be damaged during completion of the well and installation of the casing hangers. Thus, the tubing hanger seal rings 28, 30 will form a reliable seal against the wellhead housing 94, the tubing hanger will provide an effective barrier between the well bore and the environment, and the pressure within the gate valve 44 will be appropriately contained in the absence of any seals between the cover plate 88 and the body 12.

Figure 8:
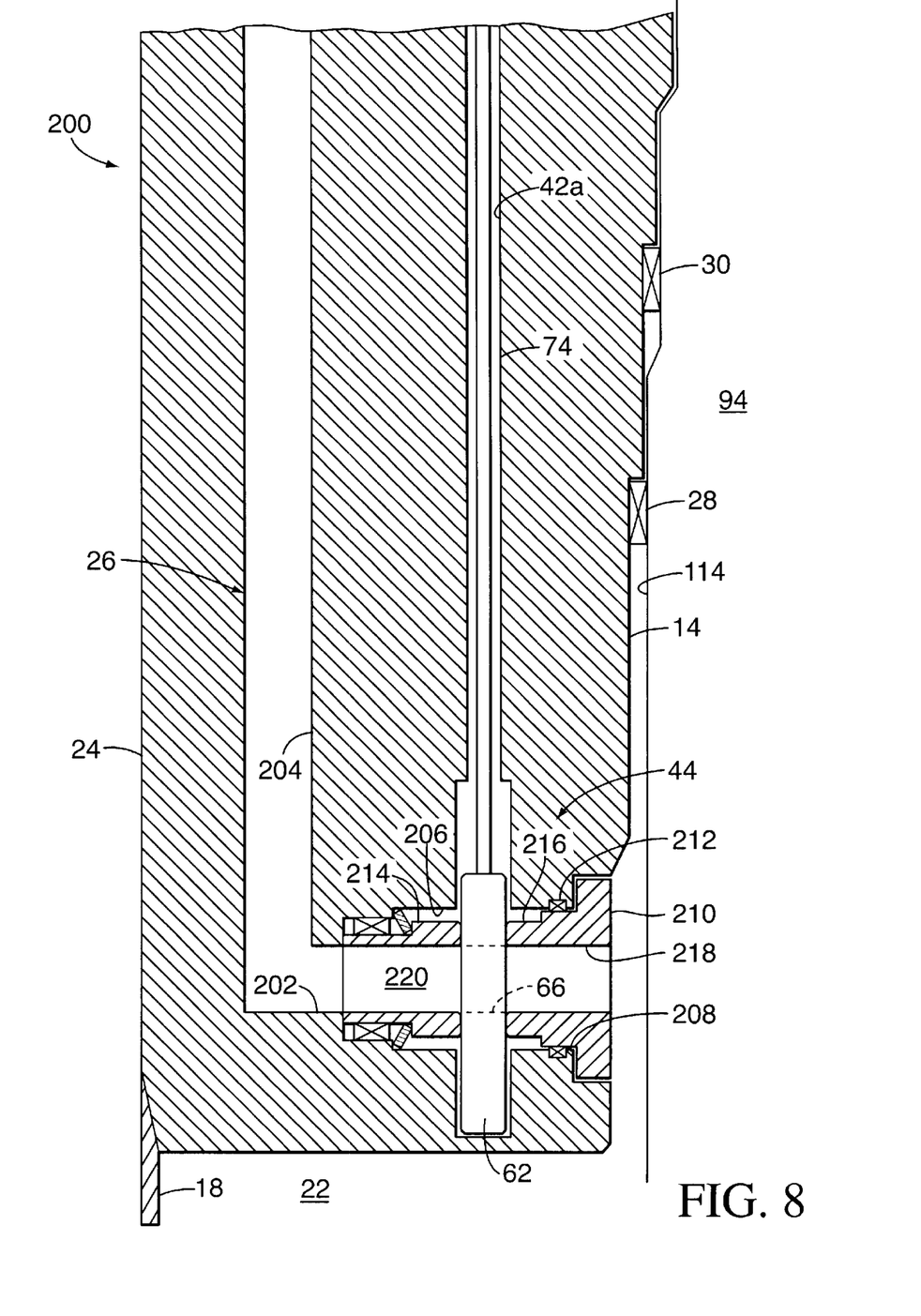
FIG. 8 is a partial, longitudinal cross-sectional view of another embodiment of the tubing hanger of the present invention.

Another embodiment of a tubing hanger in accordance with the present invention is illustrated in FIG. 8. The tubing hanger of this embodiment, which is indicated generally by reference number 200, is shown to comprise an annulus bore 26 having a first branch 202 which extends generally laterally through the body of the tubing hanger from the tubing annulus 22, and a second branch 204 which extends generally axially through the body between the first branch and the top of the tubing hanger. In addition, the tubing hanger includes a gate valve 44 which comprises a gate cavity 206 that extends laterally through the wall 14 of the tubing hanger generally coaxially with the first branch 202. The gate cavity 206 forms an opening 208 in the wall 14 which is preferably closed by a cover 210 that is ideally removably attached to the tubing hanger using any suitable means, such as bolts (not shown). In addition, the cover 210 is optimally sealed to the tubing hanger with at least one annular seal 212.

In the embodiment of the invention depicted in FIG. 8, the gate valve 44 is shown to comprise a gate 62 which is slidably disposed across the first branch 202 between a pair of seats 214, 216, at least one of which is ideally a floating seat. The first seat 214 is similar to the seats 60 discussed above. The second seat 216 can be identical to the first seat 214 or, as shown in FIG. 8, it can comprise an annular body which is attached to or formed integrally with the cover 210. In either event, the cover 210 preferably includes a port 218 which aligns with the through bores in the seats 214, 216 to define a flow passage 220 through the gate valve 44 which extends between the tubing annulus 22 and the first branch 22.

The gate valve 44 further includes an actuating mechanism to move the gate 62 between a closed position, in which a transverse hole 66 in the gate is offset from the flow passage 220, and an open position, in which the hole 66 is aligned with the flow passage, as shown in FIG. 8. The actuating mechanism (not shown) is positioned in a service and control conduit 42a that is oriented generally vertically over the gate 62. In addition, the actuating mechanism, which can be similar to any of the actuating mechanisms discussed above, is connected to the gate 62 via a valve stem 74.

Although not illustrated in FIG. 8, it should be understood that other configurations of the gate valve 44 are within the scope of the present invention. For example, the gate cavity 206 could extend longitudinally into the tubing hanger from the bottom thereof. Thus, the gate cavity 206 would intersect the first branch 202 and provide a convenient means for installing the seats in the first branch. In this example, the cover which is used to close the opening that the gate cavity makes in the bottom of the tubing hanger would not include a port 218. Rather, the first branch 202 would communicate directly with the tubing annulus 22 through the wall 14 of the tubing hanger.

Also, although not depicted in the Figures, other configurations of the annulus bore 26 are considered to be within the scope of the present invention. For example, the first branch of the annulus bore could extend generally laterally through the tubing hanger and communicate with the portion of the central bore of the wellhead housing that is located above the seals which are employed to seal the tubing hanger to the wellhead housing. In this example, the second branch would extend generally longitudinally from the first branch down through the tubing hanger to the tubing annulus. In addition, the gate valve would preferably be installed in or near the top of the tubing hanger.

It should be appreciated that the gate valve 44 provides an effective and efficient means for controlling fluid flow through the annulus bore 26. The gate valve is recognized in the industry as being a robust and reliable closure member. Moreover, since the gate valve 44 may be operated remotely, the time and expense associated with running and retrieving wireline plugs to control fluid flow through the annulus bore are eliminated. Furthermore, because the gate valve 44 is oriented generally axially in the tubing hanger 10, it occupies a minimum radial cross-sectional area of the tubing hanger and therefore allows the tubing hanger to comprise a relatively large production bore and several service and control conduits.

It should be recognized that, while the present invention has been described in relation to the preferred embodiments thereof, those skilled in the art may develop a wide variation of structural and operational details without departing from the principles of the invention. For example, the various elements illustrated in the different embodiments may be combined in a manner not illustrated above. Therefore, the appended claims are to be construed to cover all equivalents falling within the true scope and spirit of the invention.

What is claimed is:

1. A tubing hanger for a flow completion system which comprises a christmas tree connected above a wellhead housing that includes a central bore in which the tubing hanger is supported, the tubing hanger comprising:
   a generally annular body;
   a production bore which extends generally axially through the body;
   an annulus bore which extends generally axially through the body;
   the annulus bore comprising a generally lateral first branch which is connected to a generally axial second branch; and
   a closure member which includes a gate that is moveable generally axially across the first branch between an open position in which a hole in the gate is aligned with the first branch and a closed position in which the hole is offset from the first branch.

2. The tubing hanger of claim 1, further comprising:
   a first annular seal which is positioned between the body and the central bore;

a second annular seal which is positioned between the body and the central bore above the first seal;

a gate cavity in which the gate is at least partially positioned and which extends into the body from between the first and second seals;

wherein pressure within the gate cavity is contained by the first and second seals.

3. The tubing hanger of claim 1, further comprising:

a conduit which extends generally axially through the body between the gate and the top of the tubing hanger;

wherein the closure member further comprises an actuating mechanism for the gate which is positioned in the conduit.

4. The tubing hanger of claim 3, wherein the actuating mechanism comprises:

a piston which is movably disposed in the conduit and which is connected to the gate;

means for conveying pressure to a first portion of the conduit to thereby move the gate from a first position to a second position; and means for moving the gate from the second position to the first position;

wherein one of the first and second positions corresponds to the open position of the gate and the other position corresponds to the closed position of the gate.

5. The tubing hanger of claim 4, wherein the moving means comprises a mechanical biasing means.

6. The tubing hanger of claim 4, wherein the moving means comprises means for conveying pressure to a second portion of the conduit which is separated from the first portion of the conduit by the piston.

7. A flow completion system which comprises:

a wellhead housing which includes a central bore that extends generally axially therethrough;

a christmas tree which is connected above the wellhead housing;

a tubing hanger which is supported in the central bore;

the tubing hanger comprising a generally annular body and an annulus bore which extends generally axially through the body;

the annulus bore comprising a generally lateral first branch which is connected to a generally axial second branch;

the tubing hanger further comprising a closure member which includes a gate that is moveable generally axially across the first branch between an open position in which a hole in the gate is aligned with the first branch and a closed position wherein the hole is offset from the first branch.

8. The flow completion system of claim 7, wherein the tubing hanger further comprises:

a first annular seal which is positioned between the body and the central bore;

a second annular seal which is positioned between the body and the central bore above the first seal;

a gate cavity in which the gate is at least partially positioned and which extends into the body from between the first and second seals;

wherein pressure within the gate cavity is contained by the first and second seals.

9. The flow completion system of claim 8, wherein the central bore comprises at least one annular sealing surface against which the first and second seals are sealingly engageable.

10. The flow completion system of claim 9, wherein the central bore comprises:

a first portion having a diameter which is nominally the same as that of a BOP which is used during installation of the tubing hanger;

a second portion on which the at least one sealing surface is formed, the second portion having a diameter which is less than the diameter of the first portion;

a third portion against which one or more packoffs for corresponding casing hangers are sealingly engageable, the third portion having a diameter which is less than the diameter of the second portion.

11. The flow completion system of claim 7, further comprising:

a conduit which extends generally axially through the body between the gate and the top of the tubing hanger;

wherein the closure member further comprises an actuating mechanism for the gate which is positioned in the conduit.

12. The flow completion system of claim 11, wherein the actuating mechanism comprises:

a piston which is movably disposed in the conduit and which is connected to the gate;

means for conveying pressure to a first portion of the conduit to thereby move the gate from a first position to a second position; and means for moving the gate from the second position to the first position;

wherein one of the first and second positions corresponds to the open position of the gate and the other position corresponds to the closed position of the gate.

13. The flow completion system of claim 12, wherein the moving means comprises a mechanical biasing means.

14. The flow completion system of claim 12, wherein the moving means comprises means for conveying pressure to a second portion of the conduit which is separated from the first portion of the conduit by the piston.

* * * * *